United States Patent
McCaig et al.

(10) Patent No.: US 11,831,618 B2
(45) Date of Patent: Nov. 28, 2023

(54) USER DATA ELECTRONIC EXCHANGE PLATFORM

(71) Applicant: Tartle LLC, Santa Fe, NM (US)

(72) Inventors: Alexander Ramsay McCaig, Santa Fe, NM (US); Jonathan Shelon, Scarsdale, NY (US)

(73) Assignee: Tartle PBC, Santa Fe, NM (US)

( * ) Notice: Subject to any disclaimer, the term of this patent is extended or adjusted under 35 U.S.C. 154(b) by 370 days.

(21) Appl. No.: 17/267,473

(22) PCT Filed: Jul. 7, 2020

(86) PCT No.: PCT/US2020/041068
§ 371 (c)(1),
(2) Date: Feb. 9, 2021

(87) PCT Pub. No.: WO2021/007250
PCT Pub. Date: Jan. 14, 2021

(65) Prior Publication Data
US 2021/0266300 A1 Aug. 26, 2021

Related U.S. Application Data

(60) Provisional application No. 62/871,662, filed on Jul. 8, 2019.

(51) Int. Cl.
*H04L 9/40* (2022.01)
*H04L 67/306* (2022.01)

(52) U.S. Cl.
CPC ........ *H04L 63/0414* (2013.01); *H04L 67/306* (2013.01); *H04L 2463/121* (2013.01)

(58) Field of Classification Search
CPC .................................................. H04L 63/0417
See application file for complete search history.

(56) References Cited

U.S. PATENT DOCUMENTS 6,665,659 B1 * 12/2003 Logan ..................... H04L 67/56
707/999.005
6,691,231 B1 * 2/2004 Lloyd ................. H04L 63/0428
726/4

(Continued)

OTHER PUBLICATIONS

International Search Report and Written Opinion dated Oct. 1, 2020, on application No. PCT/US2020/041068.
(Continued)

*Primary Examiner* — Ponnoreay Pich
(74) *Attorney, Agent, or Firm* — Lowenstein Sandler LLP

(57) ABSTRACT

An indication that data packets of personal data that correspond to data packet types for data categories are approved for transfer between user accounts via the personal data sharing platform is provided. A first data packet identifying first personal data that is related to a first user of the first user account is received. The first data packet includes first personal data values that correspond to first attributes specified by a first data packet type and that have been individually encrypted at first user account. Whether the first data packet satisfies a condition that the first data packet include data values for each of the first attributes specified by the first data packet type for a first data category is determined. Responsive to determining that the first data packet satisfies the condition, the individually encrypted first personal data values and the corresponding first attributes are stored at a data store.

20 Claims, 5 Drawing Sheets

(56) References Cited

U.S. PATENT DOCUMENTS

| | | | | |
|---|---|---|---|---|
| 10,476,847 | B1* | 11/2019 | Smith | H04L 63/102 |
| 2005/0138398 | A1* | 6/2005 | Hansen | G06F 21/6245 |
| | | | | 713/189 |
| 2010/0153704 | A1* | 6/2010 | Winslow | H04L 63/10 |
| | | | | 713/153 |
| 2011/0040736 | A1* | 2/2011 | Kalaboukis | H04L 67/01 |
| | | | | 707/E17.014 |
| 2013/0042298 | A1* | 2/2013 | Plaza Fonseca | H04L 63/102 |
| | | | | 726/1 |
| 2013/0268357 | A1* | 10/2013 | Heath | G06Q 10/10 |
| | | | | 726/26 |
| 2015/0180839 | A1* | 6/2015 | Moffat | H04L 9/0894 |
| | | | | 713/150 |
| 2017/0070500 | A1* | 3/2017 | Hockey | H04L 9/3228 |
| 2017/0331887 | A1* | 11/2017 | Fishler | H04L 65/61 |
| 2018/0322597 | A1* | 11/2018 | Sher | G06Q 50/163 |
| 2021/0266300 | A1* | 8/2021 | McCaig | H04L 63/0414 |

OTHER PUBLICATIONS

Wang S, Zhang Y, Zhang Y. A blockchain-based framework for data sharing with fine-grained access control in decentralized storage systems. Ieee Access. Jun. 29, 2018;6:38437-50.

* cited by examiner

USER DATA ELECTRONIC EXCHANGE PLATFORM

RELATED APPLICATION

This application claims the benefit of International Application No. PCT/US20/41068, filed Jul. 7, 2020, which claims the priority to U.S. Provisional Application No. 62/871,662, filed Jul. 8, 2019, the entire content of both are hereby incorporated by reference.

BACKGROUND

Secure transmission refers to the transfer of data such as confidential or proprietary information over a secure channel. Many secure transmission methods require a type of encryption. Public key infrastructure (PKI) is a set of roles, policies, hardware, software or procedures used to create, manage, distribute, use, store and revoke digital certificates and manage public-key encryption. PKI can be used to facilitate the secure electronic transfer of information for a range of network activities.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure is a method, comprising: providing, to a plurality of user accounts, an indication that a plurality of data categories and a plurality of data packet types for the plurality of data categories have been approved by a personal data sharing platform and that data packets of personal data that correspond to the plurality of data packet types for the plurality of data categories are approved for transfer between the plurality of user accounts via the personal data sharing platform; receiving, from a first client device associated with a first user account, a first data packet identifying first personal data that is related to a first user of the first user account, wherein the first data packet comprises first personal data values of the first personal data that correspond to first attributes specified by a first data packet type and that have been individually encrypted at the first user account; determining, by a processing device, whether the first data packet comprising the individually encrypted first personal data values satisfies a condition that the first data packet include data values for each of the first attributes specified by the first data packet type for a first data category; and responsive to determining that the first data packet satisfies the condition, storing the individually encrypted first personal data values of the first data packet and the corresponding first attributes at a data store of the personal data sharing platform.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

DETAILED DESCRIPTION

Figure 1:
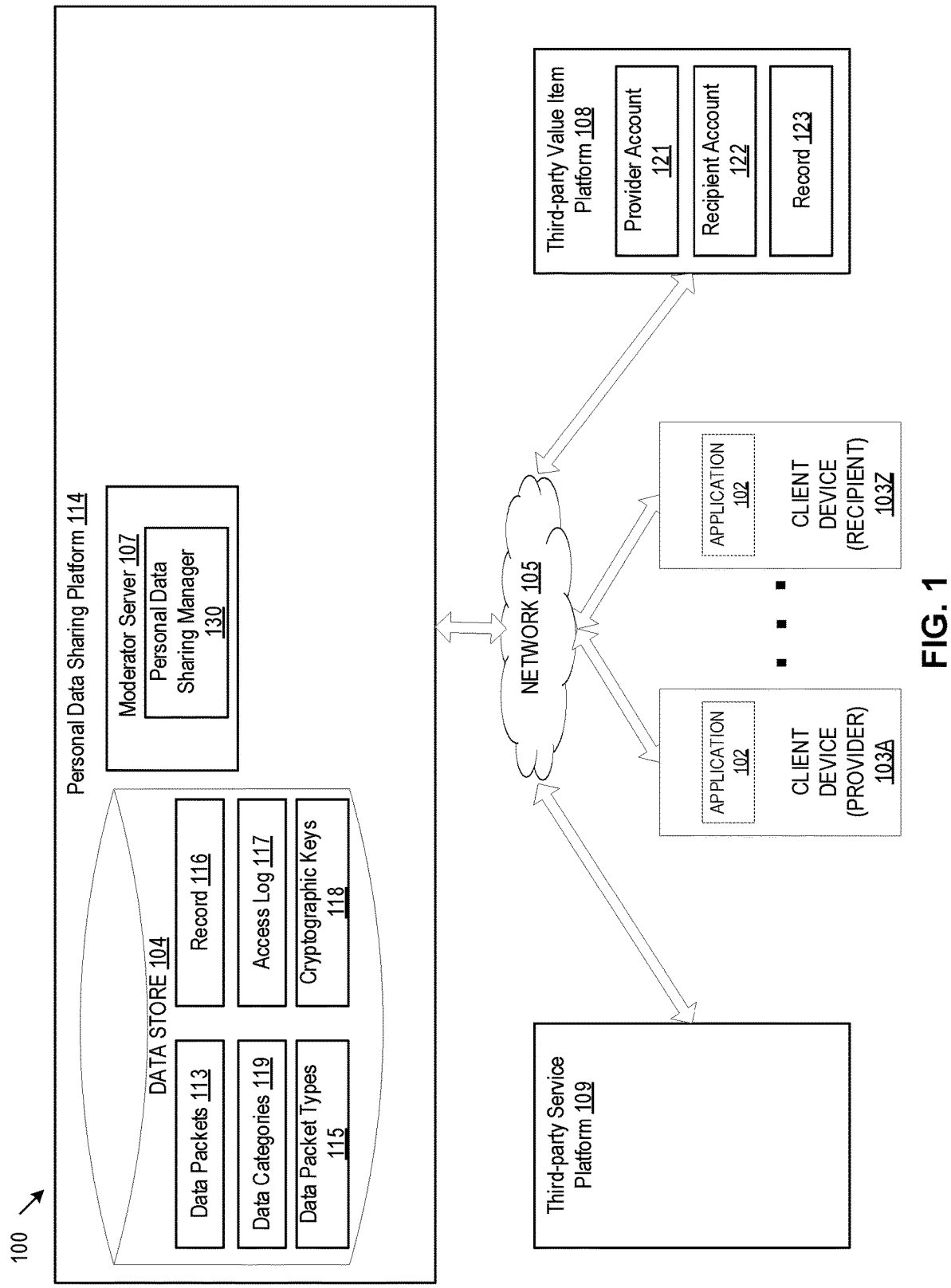
FIG. 1 illustrates an example system architecture, in accordance with embodiments of the disclosure.

Personal data can include any information which are related to an identified or identifiable natural person. Personal data can include information that can identify, relate to, describe, be associated with, or be reasonably capable of being associated with a particular natural person. Personal data can include any data where a natural person expended time or labor to create the data. The data subjects may be identifiable if they can be directly or indirectly identified, in particular by reference to an identifier such as a name, an identification number, location data, an online identifier or one of several characteristics, which expresses the physical, physiological, genetic, mental, commercial, cultural or social identity of these natural persons. Personal data can include all data which are or can be assigned to a person in any kind of way. Personal data can be part of a natural person's digital identity.

Some systems collect personal data from users of those system. Often the content of the personal data collected and the use of that data is opaque to the users of those systems. Users of those systems have little to no control over the personal data that the users have created. For example, a user may have limited control over the type of personal data that is collected, how the collected personal data is used, and where and to whom the personal data is transferred. Further, the security of personal data is becoming increasingly important at least because malicious actors can misuse personal data for various nefarious purposes. Some systems encrypt large portions of personal data to create a single hash value in order to protect the personal data from malicious systems. Once the data is encrypted in a single hash value the ability for both malicious and non-malicious computer systems to, evaluate, analyze, use and make decisions based on the encrypted personal data is dramatically curtailed. For the case of non-malicious computer systems, the personal data can be decrypted so that the decrypted personal data can be evaluated and analyzed. Once the data is decrypted, the decrypted personal data is particularly vulnerable to malicious activity.

Aspects of the disclosure address the above-mentioned and other challenges by providing data structures that enable secure encryption of personal data and that allow for the encrypted personal data to be evaluated and analyzed without decrypting the encrypted personal data. Aspects of the disclosure further address the above-mentioned and other challenges by providing a platform that facilitates the secure and efficient transfer of personal data between different computer devices or among user accounts with the consent of participating users (e.g., the personal data of those participating users).

In some embodiments, an indication is provided by a personal data sharing platform that indicates that data categories and data packet types for the data categories have been approved by a personal data sharing platform and that data packets of personal data that correspond to the data packet types for the data categories are approved for transfer between the user accounts via the personal data sharing platform.

For example, the data category can include a health category, a fitness category, a news category, a social network category. A data category can include one or more data packet types. A data packet type can specify attributes of personal data. For example, a data packet type in the health category can specify the attributes of age, height, gender, and pulse rate, etc.

In some embodiments, a first data packet identifying first personal data that is related to a first user of the first user account is received from a first client device associated with a first user account. The first data packet includes first personal data values of the first personal data that correspond to first attributes specified by a first data packet type and that have been individually encrypted at the first user account.

For example, the data values for the attributes of age, height, gender, and pulse rate can be 33, 180 centimeters, male, and 65 beats per minute, respectively. Each of the data values can be individually encrypted [e.g., hash 1, hash 2, hash 3, hash 4].

In some embodiments, the first data packet includes the first attributes specified by the first data category. In some embodiments, the first personal data values and the corresponding first attributes form attribute-value pairs. In some embodiments, the first attributes are unencrypted at the first user account. For example, a data packet can include attribute-value pairs where the attributes are unencrypted and the data values are encrypted [e.g., <age, hash 1>, <height, hash 2>, <gender, hash 3>, <pulse rate, hash 4>].

In some embodiments, the personal data sharing platform determines whether the first data packet that includes the individually encrypted first personal data values satisfies a condition that the first data packet include data values for each of the first attributes specified by the first data packet type for a first data category. Responsive to determining that the first data packet satisfies the condition, the individually encrypted first personal data values of the first data packet and the corresponding first attributes are stored at a data store of the personal data sharing platform.

In some embodiments, a request for a requested data packet having specified characteristics is received at the personal data sharing platform. The request specifies a number of data packets requested, the specified characteristics of the requested data packet, and a time range within which the requested data packet was created. The personal data sharing platform can determine a group of data packets that satisfy the request. An indication of the request is sent to user accounts that provided corresponding ones of the group of data packets to the personal data sharing platform. The group of data packets include the first data packet provided by the first user account. The personal data sharing platform can receive, from the first user account, a response that accepts the request from the second user account. If the request has not been fulfilled, the personal data sharing platform can send the personal data of the first data packet to the second user account.

As noted, a technical problem addressed by embodiments of the disclosure is the security of personal data, and in particular the ability of computer systems to evaluate, analyze, use and make decisions using encrypted personal data.

A technical solution to the above identified technical problem may include a data structure that individually encrypts data values of personal data. The data value can be part of attribute-value pair, where the attribute remains unencrypted.

Thus, the technical effect may include enhanced encryption while creating an ability of computer systems to evaluate, analyze, and make decisions based on encrypted data values of personal data. For example, the personal data sharing platform can determine whether certain attributes of a data packet have been completed by reviewing the corresponding attributes of a data packet and determining whether each attribute is paired with a corresponding hash value. Additionally, the computational resources required by malicious actors to decrypt a data packet where each data value is individually encrypted is much greater than the computational resources required by malicious actors to decrypt a data packet that is encrypted as a single hash value.

Another technical problem addressed by embodiments of the disclosure are the lack of systems that facilitates the secure and efficient transfer of personal data between different computer devices with the consent or control of users that created the personal data.

A technical solution to the above identified technical problem may include providing a personal data sharing platform that provides data categories and data types for which data packets are approved for transfer between user accounts via the personal data sharing platform. The personal data sharing platform can allow for secure transfer of encrypted personal data in data packets of a data packet type for a data category between computing devices based on consent and control of users that created the personal data.

Thus, the technical effect may include improved efficiency, security, and control in the transfer of personal data between computer devices.

For purposes of illustration, rather than limitation, aspects of the disclosure have been described with respect to personal data. In other embodiments, any type of data can be implemented.

FIG. 1 illustrates an example system architecture 100, in accordance with some embodiments of the disclosure. The system architecture 100 (also referred to as "system" herein) includes one or more of a personal data sharing platform 114 (also referred to a "personal data platform," "personal data moderator platform" or "moderator platform" herein), client devices 103A-103Z (generally referred to as "client device(s) 103" herein), third-party value item platform 108, and third-party service platform 109 connected to a network 105.

In embodiments, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In embodiments, data store 104 includes one or more persistent storages that are capable of storing content items (such as data packets) as well as data structures to tag, organize, and index the content items. Data store 104 may be hosted by one or more storage devices, such as main memory, magnetic or optical storage based disks, tapes or hard drives, network-attached storage (NAS), storage area network (SAN), and so forth.

In some embodiments, data store 104 may be a network-attached file server, while in other embodiments data store 104 may be some other type of persistent storage such as an object-oriented database, a relational database, and so forth, that may be hosted by personal data sharing platform 114 or one or more different machines coupled to the personal data sharing platform 114 via the network 105.

In some embodiments, the client devices 103A-103Z may each include computing devices such as personal computers (PCs), laptops, mobile phones, smart phones, tablet computers, netbook computers, network-connected televisions, etc. In some embodiments, client devices 103A-103Z may also be referred to as "user devices." For the sake of illustrations, client device 103A can be referred to as "provider client device" and client device 103Z can be referred to as "recipient client device" to represent different parties accessing personal data sharing platform 114. Provider client device can refer to a client device (and associated provider user account) that provides personal data of the user to the personal data sharing platform 114. Recipient client device can refer to a client device (or associated user account) that receives the personal data provided to the personal data sharing platform 114 by the provider user account. In some embodiments, each client device includes application 102. In some embodiments, the applications 102 may be applications that allow users to access and communicate with personal data sharing platform 114. For example, the application 102 may be a web browser that can access, retrieve, present, or navigate content (e.g., web pages such as Hyper Text Markup Language (HTML) pages, etc.) served by a web server. The application 102 may render, display, or present the content (e.g., a web page, a media viewer, etc.) via a display screen to a user. The application 102 may also include an embedded media player (e.g., a Flash® player or an HTML5 player) that is embedded in a web page (e.g., a web page that may provide information about a product sold by an online merchant). In another example, the application 102 may be a standalone application (e.g., a mobile application, or native application) that allows users to access and use personal data sharing platform 114. According to aspects of the disclosure, the application 102 may be a personal data sharing platform application for users to select, edit, and/or upload content, such as personal data, for sharing or transfer on the personal data sharing platform 114. As such, the applications 102 may be provided to the client devices 103A-103Z by personal data sharing platform 114. For example, the applications 102 may be one or more web pages provided by the personal data sharing platform 114. In another example, the applications 102 may be applications that are downloaded from personal data sharing platform 114. In some embodiments, application 102 can include personal data sharing manager 130.

In some embodiments, one or more of the personal data sharing platform 114, third-party value item platform 108, or third-party service platform 109 (e.g., moderator server 107) may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to respective content items or services. For example, the personal data sharing platform 114 may allow a user to consume, upload, search for types of, or transfer personal data. The personal data sharing platform 114 may also include a website (e.g., a webpage) or application back-end software that may be used to provide a user with access to the personal data sharing platform 114.

In embodiments of the disclosure, a "user" may be represented as a single individual. However, other embodiments of the disclosure encompass a "user" being an entity controlled by a set of users and/or an automated source. For example, a set of individual users federated as a community or entity may be considered a "user."

In some embodiments, the personal data sharing platform 114 can facilitate the secure transfer of personal data of users of one or more user accounts. Users of personal data sharing platform 114 can elect (authorize) whether to transfer their own personal data via the personal data sharing platform 114 and select which personal data to transfer. It can be noted that a providing user (e.g., a user that provides personal data to personal data sharing platform 114) uploads their own personal data (the personal data of the user, that the user created, and that reflects the digital identify of the user), rather than personal data of other natural persons.

In some embodiments, personal data sharing platform 114 can include moderator server 107 and data store 104. Moderator server 107 can moderate the transfer of personal data at personal data sharing platform 114, as well as keep records of the transfers and other activity performed at the personal data sharing platform 114. Moderator server 107 can include personal data sharing manager 130. Personal data sharing manager 130 can perform one or more operations as described herein. In some embodiments, personal data sharing manager 130 can be implemented at other devices, such as but not limited to, client devices 103A through 103Z.

In some embodiments, personal data sharing platform 114 can include one or more of a provider server (not shown) or recipient server (not shown). The provider server can facilitate access to the personal data sharing platform 114 for provider client devices and the recipient server can facilitate access to personal data sharing platform 114 recipient client devices. The provider server and buyer server can communicate to one another via moderator server 107, so that the operations and processes of the provider server and recipient server remain isolated from one another.

In some embodiments, a user may access personal data sharing platform 114 through a user account. The user may access (e.g., log in to) the user account by providing user account information (e.g., username and password) via an application on client device 103A (e.g., application 102). In some embodiments, the user account may be associated with a single user. In other embodiments, the user account may be a shared account (e.g., family account shared by multiple users) (also referred to as "shared user account" herein). The shared account may have multiple user profiles, each associated with a different user. The multiple users may login to the shared account using the same account information or different account information. In some embodiments, the multiple users of the shared account may be differentiated based on the different user profiles of the shared account.

In some embodiments, data store 104 can include one or more of data packets 113, data categories 119, data packet types 115, record 116, access log 117, and cryptographic keys 118.

In some embodiments, data packets 113 can include personal data of a particular users of personal data sharing platform 114 where the particular user can authorization their respective data packet(s) of personal data to be requested for transfer to other user accounts of the personal data sharing platform 114 (e.g., publish the data packets). In some embodiments, data packets 113 are encrypted at a client device (e.g., client device 103A) and provided to the personal data sharing platform 114 for storage at data store 104 where they are stored as encrypted data packets. In some embodiments, the data packets can have a data structure that includes one or more attribute-value pairs (e.g., key-value pairs).

Data categories 119 can refer to one or more categories of personal data that share particular features. The categories can include, but are not limited to, finance, healthcare, politics, travel, insurance, news, housing, hospitality, photos, shopping, social network, etc.

Each of the data categories 119 can include one or more data packet types 115. A data packet type can specify the contents of a data packet. In some embodiments, a data packet type can specify one or more attributes of a data packet. For example, in the health data category, a particular data packet type can specify the attributes of age, date of birth, gender, and received vaccinations. Data packets 113, data categories 119, and data packet types 115 are further described below, and in particular with respect to FIG. 2.

In some embodiments, data store 104 includes record 116 (also referred to as "personal data record" herein). Record 116 can refer to a data structure with one or more entries. Record 116 can record information pertaining to the transfer of any data packets 113 via personal data sharing platform 114. In some embodiments, moderator server 107 can maintain record 116. For example, the record 116 can record any requests by a user account associated with a recipient client device for one or more data packets having a data packet types for a particular data category. The record 116 can identify the timestamp of the request, the number of responses that accept the request, a number of responses that do not accept the request, and so forth. In some embodiments, the record 116 can identify information pertaining to the parties involved in the transfer of any data packets 113. In some embodiments, the record 116 does not identify any of the data values (e.g., attribute-value pairs) of the personal data that is being transferred via personal data sharing platform 114.

In some embodiments, data store 104 includes cryptographic keys 118. In some embodiments, cryptographic keys 118 can include one or more private keys (e.g., master private key) that can decrypt personal data values of data packets 113. In some embodiments, the one or more private keys are accessible by one or more approved administrators of the personal data sharing platform 114. In some embodiments, the one or more private keys can be used to generate one or more public keys (e.g., provider public keys) that are transferred to client device 103A through 103Z, an in particular to provider client devices. A public key can be used to encrypt data of the data packets 113 at the respective client devices. In some embodiments, cryptographic key management can be performed by a third-party system and the one or more private keys can be stored at the third-party system. In some embodiments, the cryptographic keys 118 can include one or more public keys provided by recipient user accounts. The recipient public keys can be used to encrypt data, such as decrypted data packets, that are to be sent to recipient client devices.

In some embodiments, data store 104 includes access log 117. Access log 117 can keep a record of any access to one or more cryptographic keys 118 that are used to decrypt the personal data values. In some embodiments, the access log 117 can keep a record of an access of the one or more private keys that can decrypt personal data values of data packets 113. For example, the access log 117 can record any login to access a private key including the account identifier and the timestamp of the login. The access log 117 can record information that identifies any data packets that were accessed by the one or more private keys, any changes made to the data packets, timestamps of any interaction with the data packets, or any other actions that alter the data packets.

In some embodiments, system 100 includes third-party service platform 109. Third-party service platform 109 can provide services or information such as social networking services and information, health services or information, travel services or information, news services or information, and so forth. A user of the third-party service platform 109 can create personal data at the third-party service platform 109. The user of the third-party service platform 109 can also be a user of the personal data sharing platform 114 and desire to transfer the personal data created at the third-party service platform 109 to the personal data sharing platform 114. A user can "integrate" their respective user account at the third-party service platform 109 such that third-party service platform 109 sends the user's personal data created at the third-party service platform 109 to the personal data sharing platform 114.

For example, the user can integrate the third-party service platform 109 into the personal data sharing platform 114 using application 102. For instance, the user can authorize the application 102 to receive personal data of the user from third-party service platform 109. Responsive to authorization, application 102 of provider client device 103A (or personal data sharing platform 114) can make application programming interface (API) requests to the third-party service platform 109 for the user's personal data. The user's personal data from the third-party service platform 109 can be received at the provider client device 103A and encrypted prior to being sent to personal data sharing platform 114 and stored at data store 104. It can be noted that "third-party" can refer to a system, platform, or elements thereof that are not controlled by personal data sharing platform 114. For example, the third-party service platform 109 can be a different legal entity from personal data sharing platform 114.

In some embodiments, system 100 includes third-party value item platform 108. The third-party value item platform 108 can facilitate a transfer of a value item between user accounts of the third-party value item platform 108. A value item (e.g., medium of exchange) can refer to any item that is deemed by the user receiving the value item or the user providing the value item to have a value (e.g., measurable value). In some embodiments, users of the personal data sharing platform 114 can establish respective user accounts at the third-party value item platform 108. A record of the contents (e.g., value items) of each user account of the third-party value item platform 108 can be stored in a record, illustrated by provider account 121 and recipient account 122. Provider account 121 of third-party value item platform 108 corresponds to a user (user account of third-party value item platform 108) that also has a provider user account (e.g., provider client device 103A) at personal data sharing platform 114. Recipient account 122 of third-party value item platform 108 corresponds to a user that also has a recipient user account (e.g., recipient client device 103Z) at personal data sharing platform 114. In some embodiments, third-party value item platform 108 maintains a record 123 (also referred to as a "value item record" herein). Record 123 can refer to a record that records information pertaining to the transfer of a value item between two parties. In some embodiments, record 123 is a public record that is maintained outside of third-party value item platform 108 and available for review by the public. In some embodiments, personal data sharing platform 114 can make API requests to third-party value item platform 108 to request information pertaining to a transfer of a value item from one user account to another user account (e.g., from recipient user account to provider user account) of the third-party value item platform 108.

Figure 2:
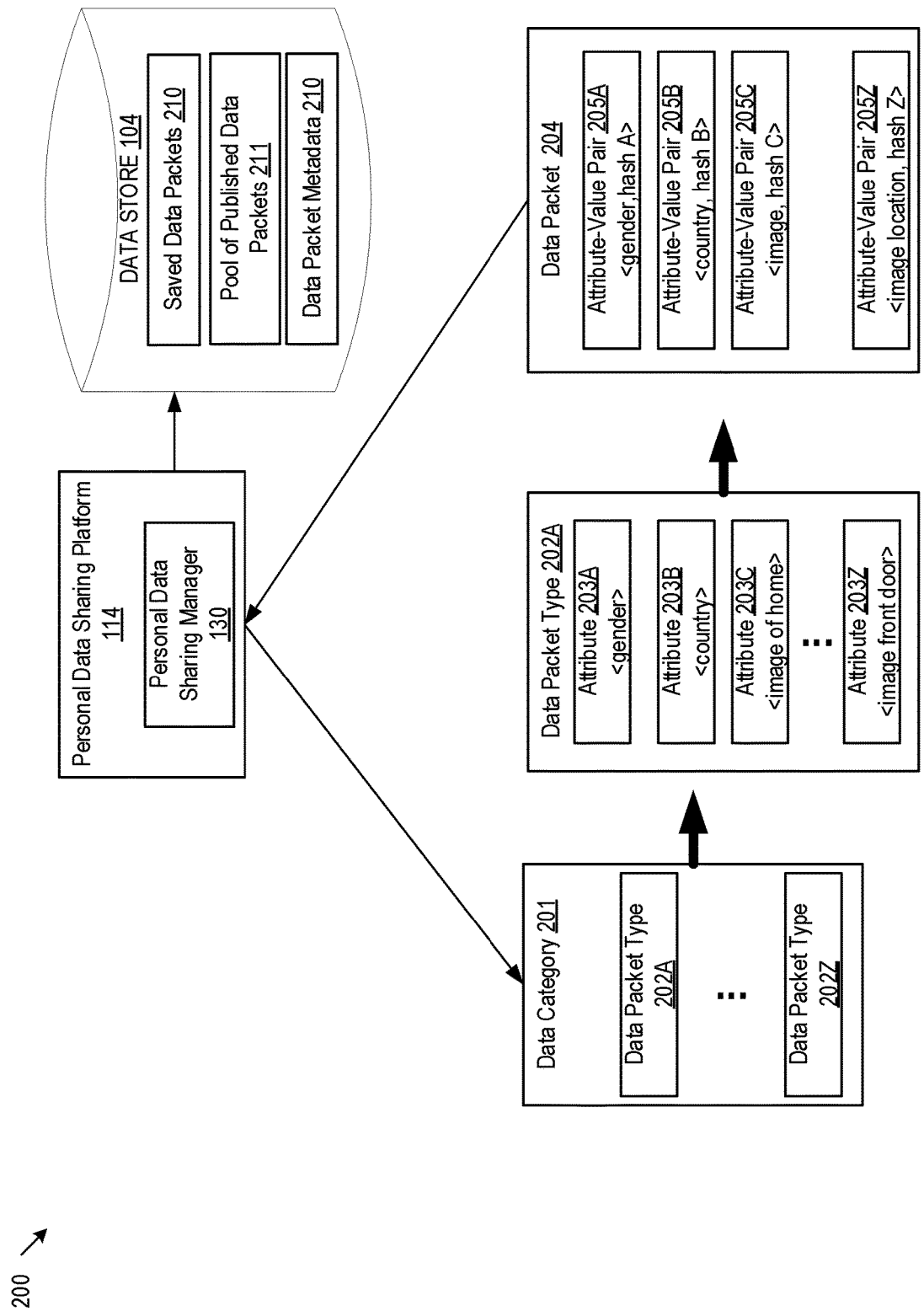
FIG. 2 illustrates a diagram of a data category, data packet type, and data packet, in accordance with some embodiments of the disclosure.

FIG. 2 illustrates a diagram of a data category, data packet type, and data packet, in accordance with some embodiments of the disclosure. Elements of FIG. 1 are used to help describe FIG. 2.

Data category 201 illustrates a data category created by personal data sharing platform 114 (e.g., moderator server 107). For example, the data category can be a photo data category. A single data category is shown for purposes of illustration, rather than limitation. The number of data categories available at personal data sharing platform 114 can be any number. Data category 201 includes one or more data packet types represented by data packet type 202A through 202Z.

Data packet type 202A of data category 201 is illustrated with the various attributes, e.g., attribute 203A through 203Z that are defined for the particular data packet type 202A. In some embodiments, the attributes of a particular data packet type remain the same for every data packet of a particular data packet type, but the values of different data packets of the particular data packet type change. As illustrated, attribute 203A of data packet type 202A is gender, attribute 203B is country, attribute 203C is image of the person's home, and attribute 203Z is an image of a person's front door.

Data packet 204 illustrates a data packet having data packet type 202A for data category 201. Data packet 204 can illustrates the data values (e.g., personal data values) that correspond to the respective attributes of the data packet type 202A. In some embodiments, data packet 204 can include attribute-value pairs. In some embodiments, the data packet includes the data values, but does not include the attributes (at least as sent by the provider client device 103A). The attributes that correspond to the data values can be inferred, such as by the order of the values at personal data sharing platform 114. In some embodiments, the attributes can be paired with corresponding encrypted data values at personal data sharing platform 114. In some embodiments, the provider client device 103A sends the encrypted data values in a data packet without one or more of the corresponding attributes. The personal data sharing platform 114 can infer the attribute-value pair, amend the data packet to include the attribute-value pair (e.g., with the encrypted data values and unencrypted attributes, and store the amended data packet at data store 104. In some embodiments, the provider client provides the data packet with the attribute-value pairs (e.g., with the encrypted data values and unencrypted attributes) and the data packet is stored at the data store 104.

In some embodiments, the data packet implements a data structure where one or more data values are encrypted individually. In some embodiments, the one or more corresponding attributes of the data structure are unencrypted. For example, data packet 204 illustrates attribute-value pairs 205A through 205Z where the attribute is unencrypted and the data value is encrypted. The attribute of the attribute-value pair 205A is gender, which is unencrypted, and the data value of the attribute-value pair 205A is encrypted and represented by hash value A. The attribute of attribute-value pair 205B is country, and the data value of attribute-value pair 205B is encrypted and represented by hash value B. In some embodiments, client device, such as client device 103A, can use a cryptographic key, such as a public key provided by personal data sharing platform 114, to individually encrypt the data values of data packet prior to sending a data packet to personal data sharing platform 114.

In some embodiments, if no data value is provided for a corresponding attribute of an attribute-value pair, the data packet is created that indicates that no value was provided for a data value for a particular attribute-value pair. For example, if no data value was provided for attribute 203A of data packet type 202A, attribute-value pair 205A of data packet 204 would be represented as "<gender, >." The absence of the hash value in the attribute-value pair 205A indicates that no data value for the gender attribute was provided by the provider user account In some embodiments, data packets can be created manually (e.g., manual data packet) by a user or created at least in part by third-party service platform 109 (e.g. integrated data packet). For example, for a manual data packet a user via a user account can select a data category and a particular data packet type for that category. The attributes for the selected data packet type can be displayed, and the user can enter data values for each of the attributes. For an integrated data packet, the data values (and potentially the attributes) are received at the client device responsive to an API request to the third-party service platform 109 requesting the personal data. The received personal data is used to populate the data values of a data packet. In both manual and integrated data packets, the data values (with or without the corresponding attributes) are individually encrypted and sent to the personal data sharing platform 114.

In some embodiments, the data packet (e.g., data packet 204) can be sent from client device (e.g., client device 130A) to personal data sharing platform 114. The personal data sharing platform 114 can save the data packet, save and publish the data packet (herein after referred to as "publish" the data packet), or notify the user account that the data packet is incomplete. In some embodiments, to save the data packet, the user requests that the personal data sharing platform 114 save the data packet at data store 104. The data packet is stored at data store 104, represented by saved data packets 210. The data packet is stored with the individually encrypted data values as received from the client device. In some embodiments, the data packet is not decrypted at any point between being received by client device and decrypting the data values for transfer to another user account.

In some embodiments, personal data sharing platform 114 can store metadata associated with data packet. In some embodiments, a stored data packet is associated with one or more of an account ID or a timestamp indicative of a time that the personal data of the data packet was created by the user. In some embodiments, the timestamp reflects the time the data packet was received by the personal data sharing platform 114. For example, integrated data packets can be associated with timestamps based on when the data packets are received by personal data sharing platform 114. In some embodiments, the timestamp can be entered by the user. For example, manual data packets can be associated with timestamps input by the user or created by the personal data sharing platform 114 based on the time the data packet was received. In some embodiments, the timestamps are standardized to a particular time zone for all the data packet saved at personal data sharing platform 114.

In some embodiments, to publish the data packet, the user authorizes personal data sharing platform 114 to add the data packet to a pool of published data packets 211 (also referred to as "pool of data packets" herein) that are allowed to be requested for transfer to other user accounts of the personal data sharing platform 114. For example, the personal data sharing platform 114 can have 50,000 data packets of a first data packet type saved at the data store 104, but only 30,000 of those data packets are authorized to be published such that the published data packets are allowed to be requested for transfer to other user accounts of the personal data sharing platform 114.

In some embodiments, even though the data values of a data packet are encrypted, the personal data sharing platform 114 can evaluate, analyze or make decisions based on the data packet at least because the attributes associated with the data packet are unencrypted. For example, personal data sharing platform 114 can determine whether a data packet is complete (e.g., includes data values for all the attributes specified by the data packet type) or incomplete (e.g., does not include data values for all the attributes specified by the data packet type) by identifying any attribute of a data packet that includes an indication that the corresponding data value is not included in the data packet (e.g., the attribute-value pair does not have a corresponding hash value). If the personal data sharing platform 114 determines that the data packet is incomplete, personal data sharing platform 114 can send an indication to the corresponding user account notifying the user that the data packet is incomplete.

In other embodiments, personal data sharing platform 114 can suggest to a user account to add one or more attribute-value pairs with existing data packets that are saved or published at personal data sharing platform 114. For example, personal data sharing platform 114 can determine that there are a large number of data packet requests for data packets with a particular attribute-value pair. The personal data sharing platform 114 can determine that existing data packets that are saved or published at personal data sharing platform 114 on behalf of a user account do not include the particular attribute-value pair (e.g. based on analysis of unencrypted attributes). The personal data sharing platform 114 can suggest the user account add the particular attribute-value pair to saved, published, or future data packets associated with the user account.

In some embodiments, personal data sharing platform 114 (e.g., moderator server 107) can create data categories and data packet types for particular data categories. Responsive to creating one or more data categories or one or more data packet types for a particular data category, personal data sharing platform 114 (e.g., moderator server 107) provides an indication to client devices 103 via respective user accounts that the particular data categories or data packet types have been created and that data packets that correspond to the data packet types are approved for transfer between the user accounts of the personal data sharing platform 114.

In some embodiments, if a user or a user account desires to transfer personal data via the personal data sharing platform 114 that does not correspond to any data packet type of any data category, such data packets are not approved for transfer between user accounts of the personal data sharing platform 114.

In some embodiments, a user account (either of the provider user account or recipient user account) can suggest one or more of a data category or data packet type (e.g., the attributes therein) for approval by the personal data sharing platform 114 (e.g., moderator server 107). The personal data sharing platform 114 (e.g., the moderator server 107) can reject the suggested data category or data packet type, approve the suggested data category or data packet type, or edit the suggested data category or data packet type. Responsive to the data category or data packet type being approved by the personal data sharing platform 114, an indication of the new data category or new data packet type is made available to the user accounts of personal data sharing platform 114. The indication further indicates that data packets that correspond to the new data packet types (or new data category) are approved for transfer between user accounts of the personal data sharing platform 114. Responsive to the data category or data packet type being rejected by the personal data sharing platform 114, the personal data sharing platform 114 can send a notification to the suggesting user account that the suggested data category or data packet type has been rejected. Responsive to the data category or data packet type being edited by the personal data sharing platform 114 (e.g., attributes of the suggested data packet type have been added or removed), the suggesting user account can reject or accept the edited data category or data packet type.

Figure 3:
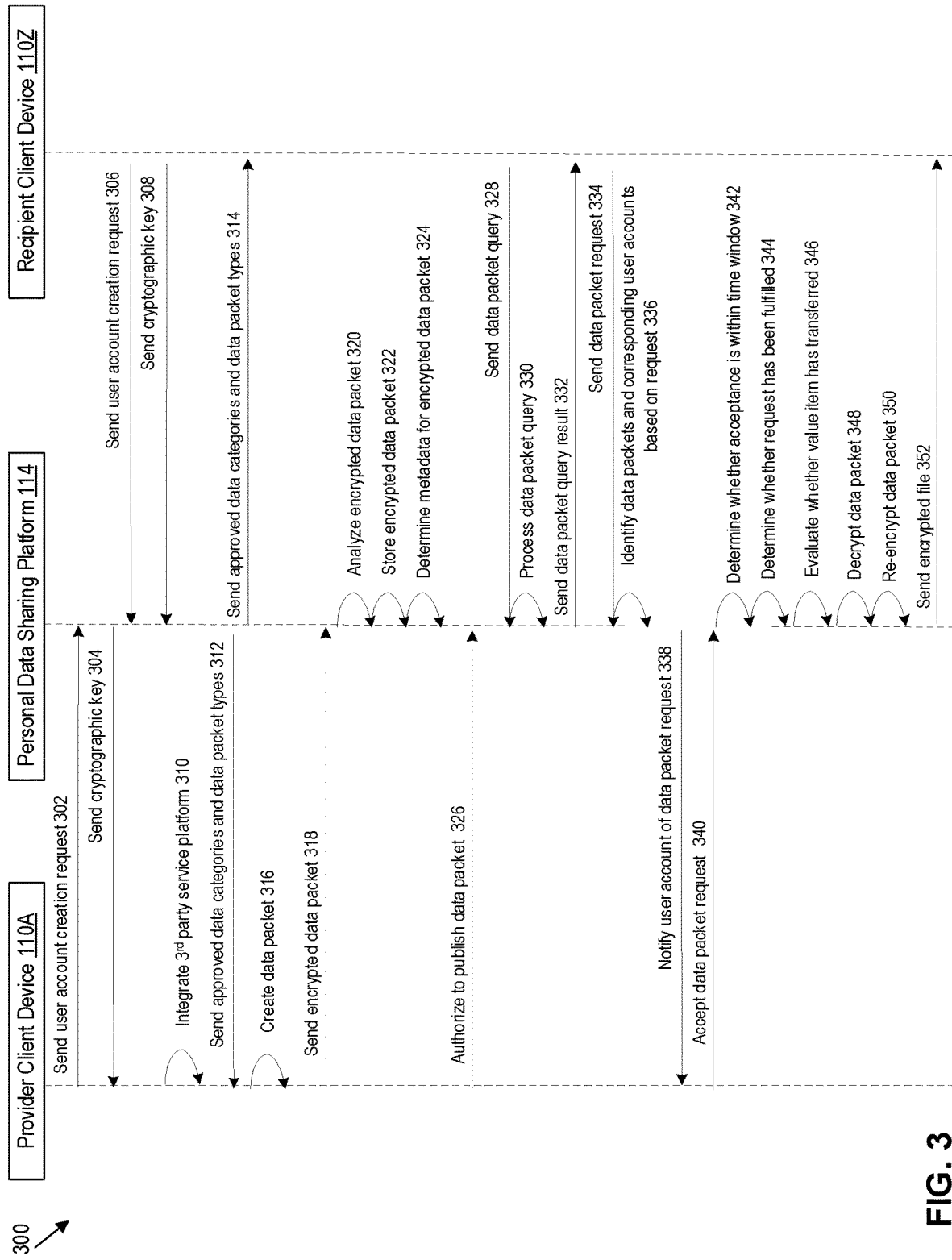
FIG. 3 is a diagram of operations of secure personal data transfer via the personal data sharing platform, in accordance with embodiments of the disclosure.

FIG. 3 is a diagram of operations of secure personal data transfer via the personal data sharing platform, in accordance with embodiments of the disclosure. Diagram 300 may include similar elements as illustrated in system 100 as described with respect to FIG. 1. It may be noted that elements of FIGS. 1 and 2 may be used herein to help describe FIG. 3. Diagram 300 illustrates provider client device 103A, recipient client device 103Z, and personal data sharing platform 114, and operations performed at each device and platform and communication between the devices and platform. In some embodiments, personal data sharing platform 114, and in particular moderator server 107, may implement the personal data sharing manager 130 to perform some or all the operations. In other embodiments, personal data sharing platform 114 (using personal data sharing manager 130) may interact with client devices 103 (using respective personal data sharing manager 130, application 102, or a combination thereof) to perform operations described with respect to FIG. 3. It may be noted that for the purposes of illustration, rather than limitation, "provider user account" is a user account of the personal data sharing platform 114 that is associated with a "providing user" and with client device 103A and a "recipient user account" is a user account of the personal data sharing platform 114 that is associated with a "recipient user" and with client device 103Z. The operations described with respect to FIG. 3 are shown to be performed serially for the sake of illustration, rather than limitation. It may be noted that in some embodiments the operations may be performed in any order or may be performed one or more times. In some embodiments, some operations may be omitted or may include the same or additional operations.

At operation 302, provider client device 103A sends a request to personal data sharing platform 114 to open a user account at personal data sharing platform 114. For example, provider client device 103A can make the request to open the user account using application 102 of provider client device 103A. To open a user account, the provider client device 103A can provide information to the personal data sharing platform 114 including one or more of a username, password, email address, name, date of birth, gender or an indication of geographic location (e.g., postal code). In some embodiments, personal data sharing platform 114 creates a new user account on behalf of the user associated with provider client device 103A based on one or more pieces of the provided information.

In some embodiments, personal data sharing platform 114 can use the information provided to open the user account to perform a query of the international trade administration (ITA) database to determine whether any user is listed on the consolidated screening list and restricted from export or transfer of particular items. In some embodiments, responsive to determining that the user is not listed on the consolidated screening list, personal data sharing platform 114 proceeds to create a user account at personal data sharing platform 114 on behalf of the user.

In some embodiments, personal data sharing platform 114 can also facilitate a creation of a user account (e.g., provider account 121) at third-party value item platform 108 on behalf of the user.

At operation 304, personal data sharing platform 114 sends to provider client device 103A a cryptographic key, such as a cryptographic public key (also referred to as "public key" herein). The public key can be used to encrypt data values of a data packet at the provider client device 103A. In some embodiments, the public key can be derived from a private key, such as the master private key, that is controlled by personal data sharing platform 114.

At operation 306, recipient client device 103Z sends a request to personal data sharing platform 114 to open a user account at personal data sharing platform 114. For example, provider client device 103A can make the request to open the user account using application 102 of recipient client device 103Z. The user account creation request by the recipient client device 103Z can be the same or similar as described with respect to operation 302. For the sake of brevity, the description associated with operation 302 is not repeated. It should be understood that the above description pertaining to operation 302 also pertains to operation 306.

In some embodiments, recipient client device 103Z can send to personal data sharing platform 114 a cryptographic key, such as a cryptographic public key. In some embodiments, the cryptographic public key can be used to encrypt one or more data packets (see operation 348) that are sent to recipient client device 103Z in response to a request from the recipient user account for data packets of a particular data packet type. In some embodiments, personal data sharing platform 114 can store, at least temporarily, the cryptographic key received from recipient client device 103Z.

At operation 310, the provider client device 103A can integrate one or more third-party service platforms, such as third-party service platform 109 of FIG. 1, with personal data sharing platform 114. For example, application 102 at provider client device 103A can present a graphical user interface (GUI) that allows a user to integrate a third-party service platform 109 with the application 102. The user can explicitly consent to have personal data from the third-party service platform 109 transferred to application 102 at provider client device 103A. For instance, the user can provide credentials (e.g., username and password) for the third-party service platform 109 to the personal data sharing platform 114 via application 102.

At operation 312 and 314, personal data sharing platform 114 can provide an indication (to provider client device 103A at operation 312 and to recipient client device 103Z at operation 314) that one or more data categories or one or more data packet types of a particular data category are available at the personal data sharing platform 114 (e.g., have been created by personal data sharing platform 114) and for which corresponding data packets of personal data are approved for transfer between user accounts of the personal data sharing platform 114. For example, the available data category and data packet types can be displayed at a GUI via instances of application 102 installed at provider client device 103A and recipient client device 103Z. In some embodiments, a suggested data category or a suggested data packet type can be provided to personal data sharing platform 114 for approval, as further described with respect to FIG. 2.

In some embodiments, provider client device 103A can create one or more data packets. The data packets can correspond to a particular data packet type for a particular data category. The available data packet types and data category (e.g., approved by the personal data sharing platform 114) are provided to the recipient client device 103Z via application 102. As described with respect to FIG. 2, the recipient user can generate one or more manual data packets or one or more integrated data packets. In some embodiments, a GUI is provided via application 102 that presents the data packet(s) created by the user. The user can select a particular data packet and review the contents of the data packet. For example, the user can review the data values or attribute-value pairs of a data packet. In some embodiments, one or more of the data values of the data packet stored at the recipient client device 103Z are unencrypted and are presented at the GUI of application 102. In some embodiments, the user can review the contents of both manual and integrated data packets.

In some embodiments, for integrated data packets, the application 102 or personal data sharing platform 114 can make an API request to the third-party service platform 109 for personal information. Responsive to the API request, third-party service platform 109 can send personal data to the recipient client device 103Z where the application 102 can format the personal data into data packets.

At operation 318, provider client device 103A individually encrypts the data values of personal data of the data packet and sends the encrypted data packet to personal data sharing platform 114. In some embodiments, the user via application 102 can request to save the data packet or publish the data packet at personal data sharing platform 114. In some embodiments, the data packets are stored at provider client device 103A until the user authorizes (e.g., provides consent) that the data packs are to be sent to the provider client device 103A.

At operation 320, personal data sharing platform 114 analyzes the encrypted data packet. As described with respect to FIG. 2, in some embodiments, personal data sharing platform 114 can analyze the encrypted data packet to determine whether the data packet is complete or incomplete. In some embodiments, responsive to determining that the data packet is incomplete, personal data sharing platform 114 can send to provider client device 103A and indication the data packet is incomplete. In some embodiments, the indication can identify the one or more attributes of the data packet that do not have corresponding data values. The user can add data values (or other information such as a timestamp) to make the data packet complete. The user can resend the data packet (or the newly entered data values or corresponding attribute-value pairs) to the personal data sharing platform 114. The newly entered data values are individually encrypted at the provider client device 103A.

At operation 322, personal data sharing platform 114 saves the encrypted data packet at data store 104. The data packet can be saved at data store 104 if the user requested the data packet be saved or published.

At operation 324, personal data sharing platform 114 determines metadata pertaining to the encrypted data packet and associates the metadata with the data packet. For example, personal data sharing platform 114 can generate or identify a timestamp indicative of a time the personal data of the data packet was created by the user of the provider user account. In another example, personal data sharing platform 114 can associate an account identifier of the provider user account with the encrypted data packets.

At operation 326, provider client device 103A authorizes the data packet stored at personal data sharing platform 114 to be published. For example, provider client device 103A authorizes the encrypted data packet to be added to a pool of data packets that are allowed to be requested for transfer to user accounts of the personal data sharing platform 114.

At operation 328, recipient client device 103Z sends a data packet query to personal data sharing platform 114. In some embodiments, the data packet query requests the availability of data packets having specified characteristics. The specified characteristics can be provided in the data packet request. The specified characteristics can refer to characteristics of the personal data.

In some embodiments, the recipient user can search for data packets having specified characteristics using application 102 at recipient client device 103Z. The application can provide a GUI that presents filtering options to the recipient user and allows the recipient user to search the personal data sharing platform 114 to determine whether data packets having the specified characteristics are available for consumption by the user (e.g., determine whether such data packets are published). In some embodiments, the query does not return the data values of any data packets. Rather the query returns an indication of whether data packet having the specified characteristics are published at the personal data sharing platform 114. In some embodiments, the specified characteristics may not include a time range parameter that identifies a time range during which the personal data of the data packet was created. In some embodiments, the specified characteristics can include a time range parameter.

For example, the recipient user may desire a specific subset of health information. For instance, the recipient user may desire information related to the cardiac health of users in a particular geography, age range and gender as well as include information regarding height, weight and cardiac health. The user can enter or select the above characteristics for the data packet query.

At operation 330, personal data sharing platform 114 processes the data packet query received from recipient client device 103Z. In some embodiments, personal data sharing platform 114 identifies any data categories or any data packet types of the data categories that correspond to the specified characteristics. In some embodiments, personal data sharing platform 114 can identify any data category or any data packet types that are similar to (or match) the specified characteristics in the data packet query.

For example, the data packet query can request a subset of health information, such as information pertaining to the cardiac health. Personal data sharing platform 114 can determine that the subset of health information is similar to the health data category that is available at the personal data sharing platform 114. Other specified characteristics such as particular geography, age range and gender as well as information regarding height, weight and cardiac health can be compared to one or more of the attributes of the data packet types for the health data category or the user account information (e.g., supplied at account creation) associated with data packets that are published for the health data category. For instance, height, weight and cardiac health information can cross-references against the particular attributes of data packet types of the health data category. Once a first subset of data packet types of the health data category are determined based on the cross-reference of attributes of the subset of data packet types with some of the specified characteristics, the first subset of data packets can further be filtered to determine a second subset of data packet (e.g., subset of the subset) by cross-referencing user account information associated with the data packets of the first subset of data with the specified characteristics of particular geography, age range and gender. It can be noted that in some embodiments, to process the data packet query the data values of the data packets stored at personal data sharing platform 114 can remain encrypted. The data values of the data packets are not decrypted to process the data packet query.

In some embodiments, responsive to identifying one or more data category or one or more data packet types that correspond the specified characteristics of the data packet query, personal data sharing platform 114 can determine the number of data packets that are published (or saved) for the data category or data packet type of a data category.

At operation 332, personal data sharing platform 114 sends the data packet query results to recipient client device 103Z. In some embodiments, the data packet query results provide one or more of an indication of one or more data categories that corresponds to the specified characteristics of the data packet query, an indication of one or more data packet types that correspond to the specified characteristic of the data packet query, or an indication of a number of data packets of a data packet type of a data category that are allowed to be requested for transfer (e.g., published—from the pool of published data packets) and satisfy (e.g., similar to) the specified characteristics of the data packet query.

For example, the personal data sharing platform 114 can identify 40,000 data packets of a data packet type of the health data category that satisfy the specified characteristics of the data packet query.

At operation 334, recipient client device 103Z sends a data packet request to personal data sharing platform 114. In some embodiments, the data packet request is a request for any data packet having a particular data packet type of a data category. In some embodiments, the attributes of the requested data packets satisfy the specified characteristics (e.g., specified in the data packet query or data packet request). In some embodiments, the data packet request can also specify a time range that the data packet was created. For example, the data packet request can request a number of data packets (e.g., 40,000) of a data packet type of the health category that were created between Jun. 1, 2020 and Jun. 30, 2020.

In some embodiments, the data packet request can be accepted within a time window (e.g., 24-hour time window) starting from the time the data packet request was made. In some embodiments, the time window is set and monitored by the personal data sharing platform 114. In other embodiments, the recipient user can set the time window that the data packet request is valid.

In some embodiments, the request can also identify a value item that can be transferred to any provider user (via the third-party value item platform) that accepts the data packet request and where the data packet request has not been fulfilled by other user accounts (e.g., based on responses to the request by other users accounts that provided data packets that satisfy the data packet request).

In some embodiments, the request can be a single-use request or a subscription request. A single-use request can refer to a single data packet request for one or more data packets that satisfy the specified characteristics. In some embodiments, a subscription request can refer to multiple data packet requests for data packets that satisfy the specified characteristics. The subscription request can further specify that the requests be placed over a time interval. For example, the subscription request can indicate that a request for data packets that satisfy the specified characteristics be sent once a day for a month. It can be noted that a data packet request and associated operations as described herein apply to both a single-user request and subscription request, unless otherwise described.

In some embodiments, the data packet request can be performed subsequent to sending data packet query (operation 328) and processing data packet query (operation 330). In situations where the data packet request is performed subsequent to the data packet query, the particular data packet type associated with the data packet request can be the data packet type identified based on the specified characteristics of the data packet query. In some embodiments where a data packet query is not performed, the data packet request can specify the characteristics (e.g., the same or similar to the specified characteristics of the data packet query) and personal data sharing platform 114 can determine corresponding data category and data packet type based on the data packet request.

At operation 336, personal data sharing platform 114 identifies the data packets and corresponding user account(s) associated with the data packets based on the data packet request. In some embodiments, personal data sharing platform 114 determines data packets from the pool of published data packets that satisfy the specified characteristics identified in the data packet request (or data packet query). In some embodiments the determined data packets are of a particular data packet type that has attributes that are similar to the specified characteristics. In some embodiments, the one or more user accounts that are associated with the determined data packets are identified (e.g., the user accounts that provided the determined data packets).

At operation 338, personal data sharing platform 114 sends a notification (e.g., qualifying notification) to provider client device 103A that notifies the provider user account that a data packet provided by the provider user account satisfies a data packet request. In some embodiments, the provider user account is also notified of the period of time that the request is valid. It can be noted that in some embodiments, all the user accounts (e.g., qualified user accounts) that provided and published data packets that satisfy the data packet request are notified of the data packet request. Qualifying notifications can be sent to the user accounts approximately simultaneously (accounting for technology constraints such as bandwidth, computational resources, latency, etc.).

In some embodiments where a subscription request is implemented, prior to sending the notification to the qualified user accounts that data packets provided by the user accounts satisfy a data packet request, each of the qualified user accounts can receive a communication that a data packet(s) associated with the respective user accounts satisfy an upcoming data packet request of a subscription. The communication can request the user to review the information associated with the data packet, and in particular whether the timestamp indicative of a time the personal data of the data packet was created is accurate. Responsive to confirming the information (e.g., timestamp) is accurate at the time the data packet request of the subscription is released, a user account will receive a notification that the data packet provided to the user account satisfies the data packet request of the subscription. Responsive to not confirming the information, the user account cannot accept the data packet request of the subscription at the time it is released.

At operation 340, provider client device 103A sends a response to the data packet request that accepts the data packet request (e.g., response of acceptance). In some embodiments, no response to the data packet request can be identified as a rejection. In some embodiments, the data packet request can expire if the provider user account does not send a response of acceptance.

At operation 342, in some embodiments, personal data sharing platform 114 determines whether the response of acceptance is received during the time window during which the data packet request is valid. If the response of acceptance is not received during the time window, personal data sharing platform 114 rejects the response of acceptance. If the response of acceptance is received during the time window, personal data sharing platform 114 proceeds to operation 344.

At operation 344, personal data sharing platform 114 determines whether the request has been fulfilled. In some embodiments, the data packet request can be fulfilled in a temporal order (e.g., first-come first-serve) based on a time that the responses of acceptance are received by the personal data sharing platform 114. If the request has been fulfilled, the total number of data packets allocated by responses of acceptance equals the number of data packets requested by the recipient user. If the request is unfulfilled, the total number of data packets allocated by responses of acceptance is less than the number of data packets requested by the recipient user. If a response of acceptance is received subsequent to request fulfilment, the response of acceptance is rejected and the corresponding data packet(s) is not made available for transfer to the recipient user account. If a response of acceptance is received prior to request fulfillment, the response of acceptance is approved and the corresponding data packet(s) is made available for transfer to the recipient user account. For example, if the data packet request is for 10,000 data packets of a data packet type and there are 40,000 published data packets of the data packet type, qualifying notifications can be sent to the 40,000 qualifying user accounts. The first 10,000 responses of acceptance received from the qualifying user accounts are approved, and any other responses of acceptance received after the first 10,000 are rejected.

In some embodiments, if the number of responses of acceptance are received at approximately the same time (e.g. within 20 seconds of one another) and are greater than the number of data packet requested, personal data sharing platform 114 can take all the responses of acceptance and randomly or pseudo-randomly select responses of acceptance until the request is fulfilled. For example, for a subscription request the qualifying user accounts are notified in advance of sending the data packet requests. Many provider user accounts can select automatic responses of acceptance. After the data packet requests are sent out to the corresponding provider user accounts, the personal data sharing platform 114 can receive many responses of acceptance approximately simultaneously. Random or pseudo-random approval of responses of acceptance can help ensure fairness to providing users.

At operation 346, personal data sharing platform 114 evaluates whether a value item has been transferred. In some embodiments and as noted above, the request for data packets can identify a value item that can be transferred to any provider user (via the third-party value item platform) that accepts the data packet request and where the response of acceptance is approved by the personal data sharing platform 114 (e.g., based on fulfillment or non-fulfillment of the data packet request). In some embodiments, the personal data sharing platform 114 can send a request, such as an API request, to determine if the value item has been transferred between corresponding accounts of the third-party value item platform 108. In some embodiments, the personal data sharing platform 114 can review a public record associated with the third-party value item platform 108 to determine whether the value item has been transferred between corresponding user accounts of the third-party value item platform 108.

At operation 348, personal data sharing platform 114 decrypts one or more data packets corresponding to the data packet request from the recipient user account associated with recipient client device 103Z. The data packets can be decrypted by the one or more private keys controlled by the personal data sharing platform 114. In some embodiments, personal data sharing platform 114 decrypts the one or data packets responsive to determining that each account of the third-party value item platform 108 that corresponds to the provider user accounts (e.g. associated with approved responses of acceptance) have received transfers of the value item from the account of the third-party value item platform 108 that corresponds to the recipient user account. In some embodiments, the data packets are decrypted and the attribute-value pairs of the data packets are placed into a file.

At operation 350, personal data sharing platform 114 re-encrypts the attribute-value pair(s) using the public key provided by the recipient user account. In some embodiments, the entire file can be encrypted. In some embodiments, one or more of the data values of the attribute-value pairs can be individually encrypted.

At operation 352, personal data sharing platform 114 sends the encrypted file containing the requested data packets to the recipient client device 103Z.

In some embodiments, one or more of the communications between the personal data sharing platform 114 and provider client device 103A or recipient client device 103Z can be via a virtual private network.

Figure 4:
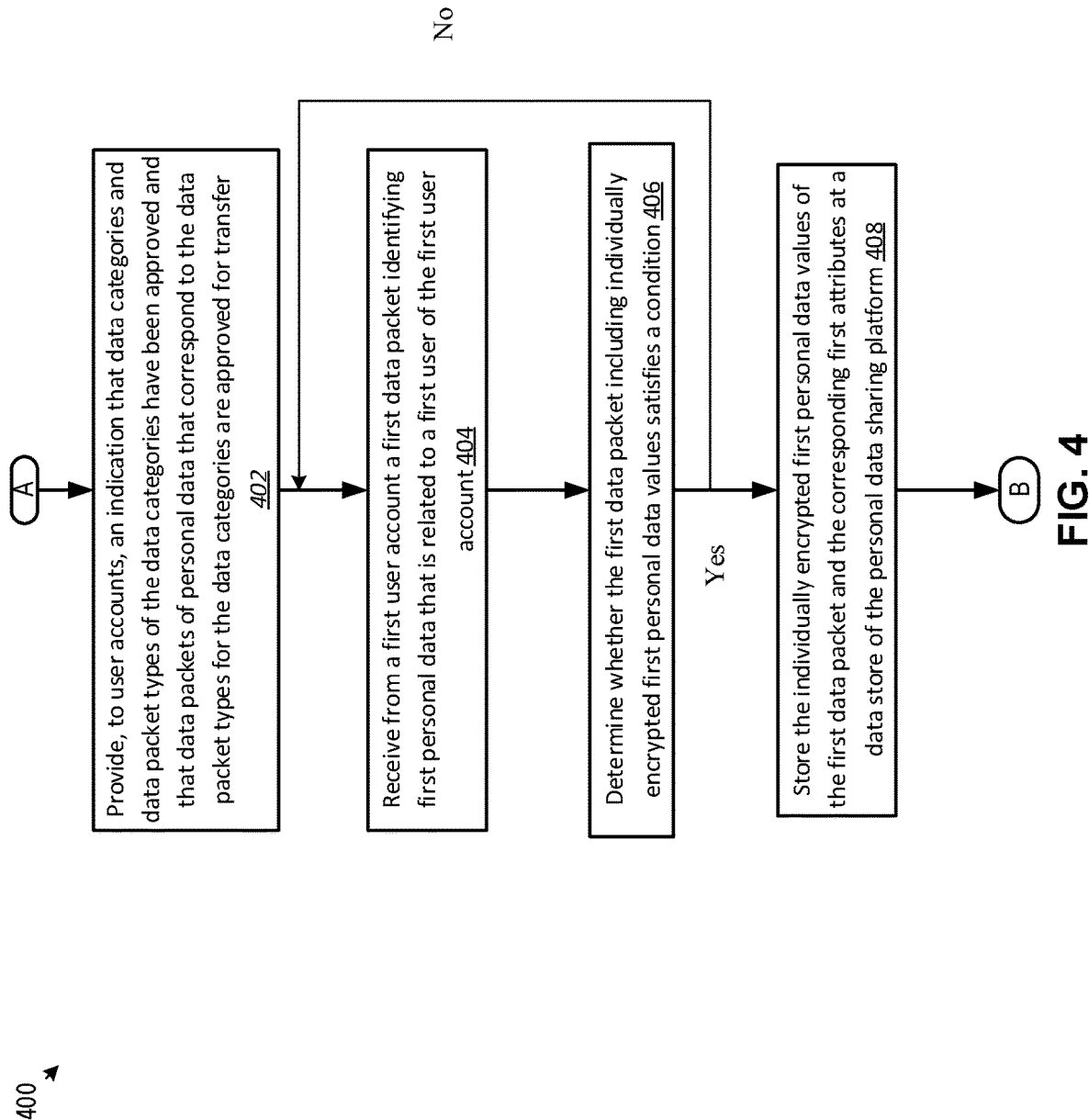
FIG. 4 is a flow diagram of an example method of secure transfer of personal data, in accordance with some embodiments of the disclosure.

FIG. 4 is a flow diagram of an example method of secure transfer of personal data, in accordance with some embodiments of the disclosure. Method 400 can be performed by processing logic that can include hardware (circuitry, dedicated logic, etc.), software (e.g., instructions run on a processing device), or a combination thereof. In some embodiments, some or all the operations of method 400 can be performed by one or more components of system 100 of FIG. 1 or system 200 of FIG. 2. In other embodiments, one or more operations of method 400 can be performed by personal data sharing manager 130 of personal data sharing platform 114 as described with respect to FIGS. 1 and 2.

At block 402, processing logic provides, to user accounts, an indication that data categories and data packet types of the data categories have been approved and that data packets of personal data that correspond to the data packet types for the data categories are approved for transfer. In some embodiments, processing logic provides, to user accounts, an indication that data categories and data packet types for the data categories have been approved by a personal data sharing platform and that data packets of personal data that correspond to the data packet types for data categories are approved for transfer between the user accounts via the personal data sharing platform.

At block 404, processing logic receives, from a first user account, a first data packet identifying first personal data that is related to a first user of the first user account. In some embodiments, processing logic receives, from a first client device associated with a first user account, a first data packet identifying first personal data that is related to a first user of the first user account. The first data packet includes first personal data values of the first personal data that correspond to first attributes specified by a first data packet type and that have been individually encrypted by the first user account.

At block 406, processing logic determines whether the first data packet including individually encrypted first personal data values satisfies a condition. In some embodiments, processing logic determines whether the first data packet that include the individually encrypted first personal data values satisfies a condition that the first data packet include data values for each of the first attributes specified by the first data packet type for a first data category. Responsive to determining that the first data packet satisfies the condition, processing logic proceeds to block 408. Responsive to determining that the first data packet does not satisfy the condition, processing logic returns to block 404. At block 404, the first user account can correct the first data packet and resubmit the corrected data packet to personal data sharing platform.

In some embodiments, the first data packet includes the first attributes specified by the first data category. In some embodiments, the first personal data values and the corresponding first attributes form attribute-value pairs. In some embodiments, the first attributes are received at the personal data sharing platform 114 as unencrypted attributes.

In some embodiments, to determine whether the first data packet that includes the individually encrypted first personal data values satisfies the condition, for each of the first attributes specified by the first data packet type processing logic identifies an unencrypted attribute of the first attributes. Processing logic also determines whether the unencrypted attribute is associated with a corresponding encrypted data value of the first personal data. In some embodiments, responsive to determining that any of the first attributes specified by the first data packet type are unassociated with corresponding ones of the individually encrypted first personal data values, processing logic determines that the condition has not been satisfied. If the condition has not been satisfied, processing logic sends, to the first user account, a notification that the first data packet is an incomplete data packet. In some embodiments, responsive to determining that (e.g., all of) the first attributes specified by the first data packet type are associated with corresponding ones of the individually encrypted first personal data values, processing logic determines that the condition has been satisfied (and proceeds to block 408).

At block 408, processing logic stores the individually encrypted first personal data values of the first data packet and the corresponding first attributes at a data store of the personal data sharing platform. In some embodiments, responsive to determining that the first data packet satisfies the condition, processing logic stores the individually encrypted first personal data values of the first data packet and the corresponding first attributes at a data store of the personal data sharing platform.

In some embodiments, processing logic associates the first data packet stored at the data store with first metadata that includes a first timestamp information indicative of a time that the first personal data was created by the first user.

In some embodiments, processing logic receives, from the first user account, an authorization to add the first data packet to a pool of data packets that are allowed to be requested for transfer to the user accounts of the personal data sharing platform.

In some embodiments, processing logic receives, from a second user account, a query for a first group of data packets having specified characteristics. In some embodiments, processing logic identifies a second data category and a second data packet type of the second data category that corresponds to the specified characteristics. In some embodiments, processing logic provides, to the second user account, query results that provide an indication of a first number of the first group of data packets. The first group of data packets correspond to the second data packet type of the second data category. The first group of data packets are from the pool of data packets that are allowed to be requested for transfer and each have attributes that satisfy the specified characteristics.

In some embodiments, processing logic receives, from a second user account, a request for a requested data packet having specified characteristics. The request specifies a number of data packets requested, the specified characteristics of the requested data packet, and a time range within which the requested data packet was created. In some embodiments, responsive to the request, processing logic determines a second group of data packets from the pool of data packets that satisfy the request. The second group of data packets are of a second data packet type. In some embodiments, processing logic sends an indication of the request to user accounts that provided corresponding ones of the second group of data packets to the personal data sharing platform. The second group of data packets include the first data packet provided by the first user account. In some embodiments, processing logic receives, from the first user account, a response that accepts the request from the second user account. In some embodiments, processing logic decrypts the first personal data values of the first data packet.

In some embodiments, processing logic determines whether the request for the requested data packet having the specified characteristics has been fulfilled based on other responses to the request from other of the user accounts that provided the second group of data packets and that were received prior to the response from the first user account. In some embodiments, responsive to determining that the request for the second data packet type is unfulfilled, processing logic decrypts the first personal data values. In some embodiments, responsive to determining that the request for the second data packet type is fulfilled, the response of acceptance is rejected (or denied).

In some embodiments, processing logic verifies whether a value item was transferred from a user account of a third-party system to another user account of the third-party system. The user account of the third-party system corresponds to the second user account of the personal data sharing platform. The other user account of the third-party system corresponds to the first user account of the third-party system. In some embodiments, responsive to verifying that the value item was transferred from the user account to the other user account of the third-party system, processing logic transfers the attribute-value pairs to the second user account. In some embodiments, responsive to verifying that the value item was not transferred from the user account to the other user account of the third-party system, processing logic does not transfer the attribute-value pairs to the second user account and cancels the data packet request.

In some embodiments, processing logic encrypts the attribute-value pairs using a public encryption key associated with second user account. The encrypted attribute-value pairs are transferred to the second user account.

In some embodiments, responsive to decrypting the first personal data values of the first data packet, processing logic transfers, to the second user account, attribute-value pairs that include the first personal data values and the corresponding first attributes.

Figure 5:
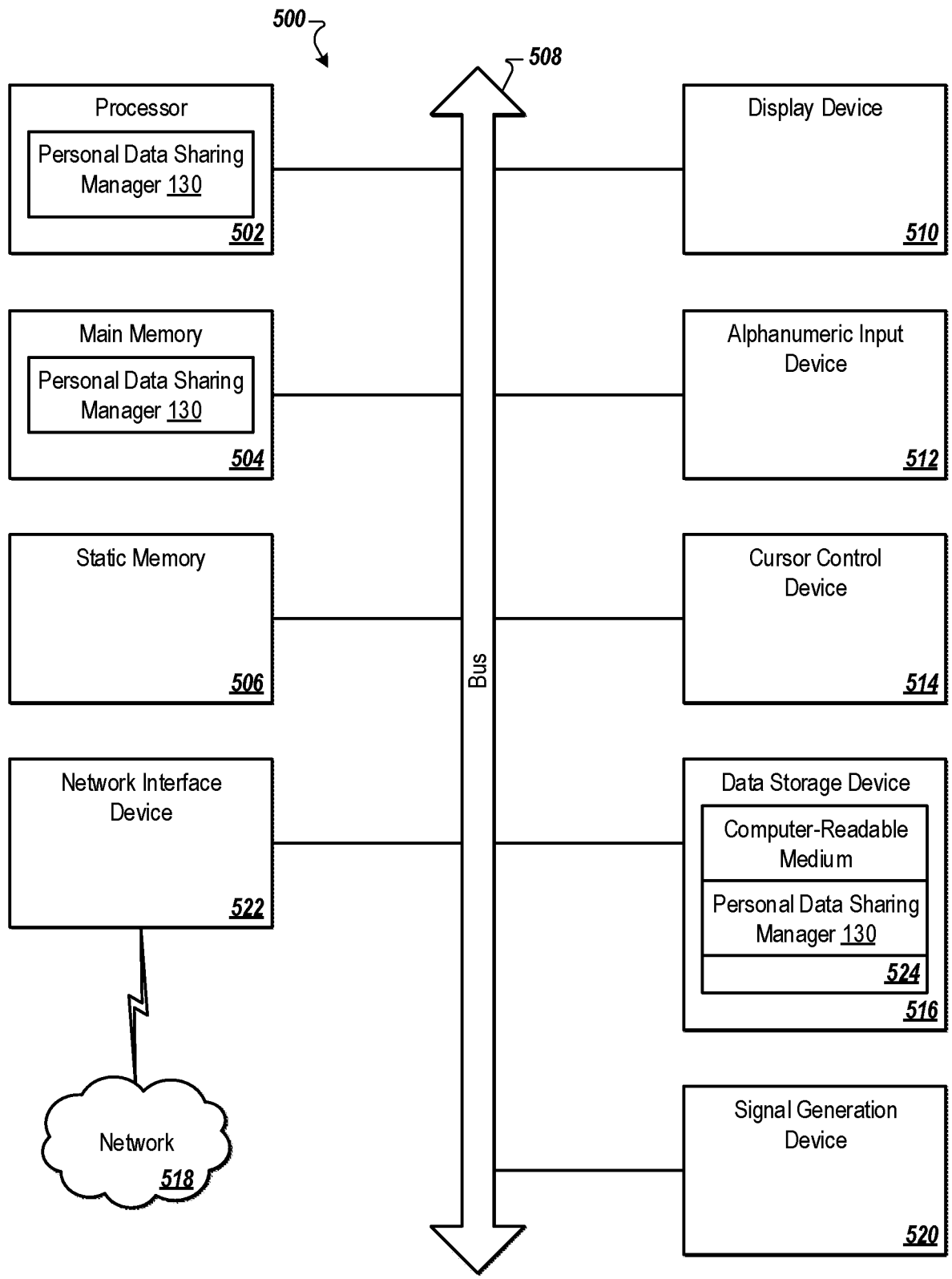
FIG. 5 is a block diagram illustrating an exemplary computer system, in accordance with s embodiments of the disclosure.

FIG. 5 depicts a block diagram of an example computing system operating in accordance with one or more aspects of the present disclosure. In various illustrative examples, computer system 500 may correspond to any of the computing devices operating within the disclosure.

In certain embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a computer-readable storage medium 524 (which may be a non-transitory computer-readable storage medium, although the disclosure is not limited to this) which may store instructions 526 encoding any one or more of the methods or functions described herein, including instructions implementing the personal data sharing manager 130 for implementing any of the methods described herein.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "applying", "generating", "updating", "storing", "receiving", "identifying", "retrieving", "providing", "determining", "modifying", "refraining", "presenting", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it can be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not necessarily intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other embodiments will be apparent to those of skill in the art upon reading and understanding the above description. The scope of the disclosure can, therefore, be determined with reference to the appended claims, along with the full scope of equivalents to which such claims are entitled.

What is claimed:

1. A method, comprising:
    providing, to a plurality of user accounts, an indication that a plurality of data categories and a plurality of data packet types for the plurality of data categories have been approved by a personal data sharing platform and that data packets of personal data that correspond to the plurality of data packet types for the plurality of data categories are approved for transfer between the plurality of user accounts via the personal data sharing platform;
    receiving, from a first client device associated with a first user account, a first data packet identifying first personal data that is related to a first user of the first user account, wherein the first data packet comprises first personal data values of the first personal data that correspond to first attributes specified by a first data packet type and that have been individually encrypted at the first user account;

determining, by a processing device, whether the first data packet comprising the individually encrypted first personal data values satisfies a condition that the first data packet include data values for each of the first attributes specified by the first data packet type for a first data category; and responsive to determining that the first data packet satisfies the condition, storing the individually encrypted first personal data values of the first data packet and the corresponding first attributes at a data store of the personal data sharing platform.

2. The method of claim 1, wherein the first data packet further comprises the first attributes specified by the first data category, wherein the first personal data values and the corresponding first attributes form attribute-value pairs, and wherein the first attributes are received at the personal data sharing platform as unencrypted attributes.

3. The method of claim 2, wherein determining whether the first data packet comprising the individually encrypted first personal data values satisfies the condition, the method further comprising:

for each of the first attributes specified by the first data packet type:
identifying an unencrypted attribute of the first attributes; and
determining whether the unencrypted attribute is associated with a corresponding encrypted data value of the first personal data;

responsive to determining that any of the first attributes specified by the first data packet type are unassociated with corresponding ones of the individually encrypted first personal data values,
determining that the condition has not been satisfied; and
sending, to the first user account, a notification that the first data packet is an incomplete data packet; and responsive to determining that the first attributes specified by the first data packet type are associated with corresponding ones of the individually encrypted first personal data values, determining that the condition has been satisfied.

4. The method of claim 1, further comprising:
associating the first data packet stored at the data store with first metadata comprising a first timestamp information indicative of a time that the first personal data was created by the first user.

5. The method of claim 1, further comprising:
receiving, from the first user account, an authorization to add the first data packet to a pool of data packets that are allowed to be requested for transfer to the plurality of user accounts of the personal data sharing platform.

6. The method of claim 5, further comprising:
receiving, from a second user account, a query for a first plurality of data packets having specified characteristics;
identifying a second data category and a second data packet type of the second data category that corresponds to the specified characteristics; and
providing, to the second user account, query results that provide an indication of a first number of the first plurality of data packets, where the first plurality of data packets correspond to the second data packet type of the second data category, wherein the first plurality of data packets are from the pool of data packets that are allowed to be requested for transfer and each have attributes that satisfy the specified characteristics.

7. The method of claim 5, further comprising:
receiving, from a second user account, a request for a requested data packet having specified characteristics, wherein the request specifies a number of data packets requested, the specified characteristics of the requested data packet, and a time range within which the requested data packet was created;
responsive to receiving the request, determining a second plurality of data packets from the pool of data packets that satisfy the request, wherein the second plurality of data packets are of a second data packet type;
sending an indication of the request to user accounts that provided corresponding ones of the second plurality of data packets to the personal data sharing platform, wherein the second plurality of data packets comprise the first data packet provided by the first user account;
receiving, from the first user account, a response that accepts the request from the second user account;
decrypting the first personal data values of the first data packet; and
responsive to decrypting the first personal data values of the first data packet, transferring, to the second user account, attribute-value pairs comprising the first personal data values and the corresponding first attributes.

8. The method of claim 7, further comprising:
determining whether the request for the requested data packet having the specified characteristics has been fulfilled based on other responses to the request from other of the user accounts that provided the second plurality of data packets and that were received prior to the response from the first user account, wherein the first personal data values are decrypted responsive to determining that the request for the second data packet type is unfulfilled.

9. The method of claim 7, further comprising:
encrypting the attribute-value pairs using a public encryption key associated with second user account, wherein the encrypted attribute-value pairs are transferred to the second user account.

10. The method of claim 7, further comprising:
verifying whether a value item was transferred from a user account of a third-party system to another user account of the third-party system, wherein the user account of the third-party system corresponds to the second user account of the personal data sharing platform, wherein the other user account of the third-party system corresponds to the first user account of the third-party system, wherein the attribute-value pairs are transferred to the second user account responsive to verifying that the value item was transferred from the user account to the other user account of the third-party system.

11. A system, comprising:
a memory; and
a processing device, coupled to the memory, to:
provide, to a plurality of user accounts, an indication that a plurality of data categories and a plurality of data packet types for the plurality of data categories have been approved by a personal data sharing platform and that data packets of personal data that correspond to the plurality of data packet types for the plurality of data categories are approved for transfer between the plurality of user accounts via the personal data sharing platform;

receive, from a first client device associated with a first user account, a first data packet identifying first personal data that is related to a first user of the first user account, wherein the first data packet comprises first personal data values of the first personal data that correspond to first attributes specified by a first data packet type and that have been individually encrypted at the first user account;

determine whether the first data packet comprising the individually encrypted first personal data values satisfies a condition that the first data packet include data values for each of the first attributes specified by the first data packet type for a first data category; and responsive to determining that the first data packet satisfies the condition, store the individually encrypted first personal data values of the first data packet and the corresponding first attributes at a data store of the personal data sharing platform.

12. The system of claim 11, wherein the first data packet further comprises the first attributes specified by the first data category, wherein the first personal data values and the corresponding first attributes form attribute-value pairs, and wherein the first attributes are received at the personal data sharing platform as unencrypted attributes.

13. The system of claim 12, wherein to determine whether the first data packet comprising the individually encrypted first personal data values satisfies the condition, the processing device further to:

for each of the first attributes specified by the first data packet type:
identify an unencrypted attribute of the first attributes; and
determine whether the unencrypted attribute is associated with a corresponding encrypted data value of the first personal data;

responsive to determining that any of the first attributes specified by the first data packet type are unassociated with corresponding ones of the individually encrypted first personal data values,
determine that the condition has not been satisfied; and
send, to the first user account, a notification that the first data packet is an incomplete data packet; and responsive to determining that the first attributes specified by the first data packet type are associated with corresponding ones of the individually encrypted first personal data values, determine that the condition has been satisfied.

14. The system of claim 11, the processing device further to:
receive, from the first user account, an authorization to add the first data packet to a pool of data packets that are allowed to be requested for transfer to the plurality of user accounts of the personal data sharing platform.

15. The system of claim 14, the processing device further to:
receive, from a second user account, a request for a requested data packet having specified characteristics, wherein the request specifies a number of data packets requested, the specified characteristics of the requested data packet, and a time range within which the requested data packet was created;
responsive to receiving the request, determine a second plurality of data packets from the pool of data packets that satisfy the request, wherein the second plurality of data packets are of a second data packet type;
send an indication of the request to user accounts that provided corresponding ones of the second plurality of data packets to the personal data sharing platform, wherein the second plurality of data packets comprise the first data packet provided by the first user account;
receive, from the first user account, a response that accepts the request from the second user account;
decrypt the first personal data values of the first data packet; and
responsive to decrypting the first personal data values of the first data packet, transfer, to the second user account, attribute-value pairs comprising the first personal data values and the corresponding first attributes.

16. A non-transitory computer-readable medium comprising instructions that, responsive to execution by a processing device, cause the processing device to perform operations comprising:

providing, to a plurality of user accounts, an indication that a plurality of data categories and a plurality of data packet types for the plurality of data categories have been approved by a personal data sharing platform and that data packets of personal data that correspond to the plurality of data packet types for the plurality of data categories are approved for transfer between the plurality of user accounts via the personal data sharing platform;

receiving, from a first client device associated with a first user account, a first data packet identifying first personal data that is related to a first user of the first user account, wherein the first data packet comprises first personal data values of the first personal data that correspond to first attributes specified by a first data packet type and that have been individually encrypted at the first user account;

determining, by the processing device, whether the first data packet comprising the individually encrypted first personal data values satisfies a condition that the first data packet include data values for each of the first attributes specified by the first data packet type for a first data category; and responsive to determining that the first data packet satisfies the condition, storing the individually encrypted first personal data values of the first data packet and the corresponding first attributes at a data store of the personal data sharing platform.

17. The non-transitory computer-readable medium of claim 16, wherein the first data packet further comprises the first attributes specified by the first data category, wherein the first personal data values and the corresponding first attributes form attribute-value pairs, and wherein the first attributes are received at the personal data sharing platform as unencrypted attributes.

18. The non-transitory computer-readable medium of claim 17, wherein determining whether the first data packet comprising the individually encrypted first personal data values satisfies the condition, the operations further comprising:

for each of the first attributes specified by the first data packet type:
identifying an unencrypted attribute of the first attributes; and
determining whether the unencrypted attribute is associated with a corresponding encrypted data value of the first personal data;

responsive to determining that any of the first attributes specified by the first data packet type are unassociated with corresponding ones of the individually encrypted first personal data values,
determining that the condition has not been satisfied; and sending, to the first user account, a notification that the first data packet is an incomplete data packet; and responsive to determining that the first attributes specified by the first data packet type are associated with corresponding ones of the individually encrypted first personal data values, determining that the condition has been satisfied.

19. The non-transitory computer-readable medium of claim 16, the operations further comprising:

receiving, from the first user account, an authorization to add the first data packet to a pool of data packets that are allowed to be requested for transfer to the plurality of user accounts of the personal data sharing platform.

20. The non-transitory computer-readable medium of claim 19, the operations further comprising:

receiving, from a second user account, a request for a requested data packet having specified characteristics, wherein the request specifies a number of data packets requested, the specified characteristics of the requested data packet, and a time range within which the requested data packet was created;

responsive to receiving the request, determining a second plurality of data packets from the pool of data packets that satisfy the request, wherein the second plurality of data packets are of a second data packet type;

sending an indication of the request to user accounts that provided corresponding ones of the second plurality of data packets to the personal data sharing platform, wherein the second plurality of data packets comprise the first data packet provided by the first user account;

receiving, from the first user account, a response that accepts the request from the second user account;

decrypting the first personal data values of the first data packet; and responsive to decrypting the first personal data values of the first data packet, transferring, to the second user account, attribute-value pairs comprising the first personal data values and the corresponding first attributes.

* * * * *